United States Patent
Kouznetsov et al.

(10) Patent No.: US 12,189,109 B2
(45) Date of Patent: Jan. 7, 2025

(54) LIGHT DISTRIBUTION DEVICE, ILLUMINATION SYSTEM AND IMAGING SYSTEM FOR IMAGING OF SAMPLES WITHIN MICROSCOPY

(71) Applicants: IMEC VZW, Leuven (BE); KATHOLIEKE UNIVERSITEIT LEUVEN, Leuven (BE)

(72) Inventors: Dmitry Kouznetsov, Korbeek-lo (BE); Niels Verellen, Heverlee (BE); Qingzhong Deng, Oud-Heverlee (BE)

(73) Assignees: IMEC VZW, Leuven (BE); KATHOLIEKE UNIVERSITEIT LEUVEN, Leuven (BE)

( * ) Notice: Subject to any disclaimer, the term of this patent is extended or adjusted under 35 U.S.C. 154(b) by 224 days.

(21) Appl. No.: 18/083,830

(22) Filed: Dec. 19, 2022

(65) Prior Publication Data

US 2023/0194844 A1 Jun. 22, 2023

(30) Foreign Application Priority Data

Dec. 21, 2021 (EP) .................................. 21216417

(51) Int. Cl.
*G02B 21/06* (2006.01)
*F21V 8/00* (2006.01)
(Continued)

(52) U.S. Cl.
CPC ......... *G02B 21/06* (2013.01); *G01N 21/6458* (2013.01); *G02B 6/0028* (2013.01);
(Continued)

(58) Field of Classification Search
CPC .. G01N 21/6458; G02B 21/06; G02B 21/082; G02B 21/10; G02B 21/16; G02B 6/0028
See application file for complete search history.

(56) References Cited

U.S. PATENT DOCUMENTS 3,753,157 A   8/1973   Ash et al.
5,349,602 A   9/1994   Mehuys et al.
(Continued)

FOREIGN PATENT DOCUMENTS

CA    3062850 A1    10/2018
CN    106950208 A   7/2017
EP    3839483 A1    6/2021

OTHER PUBLICATIONS

Arisev, et al., "Enabling High Resolution Fluorescence Imaging and Detection Using Integrated Photonics", ECIO Conference Submission 2020.
(Continued)

*Primary Examiner* — Mark R Gaworecki
(74) *Attorney, Agent, or Firm* — MOSER TABOADA

(57) ABSTRACT

According to an aspect of the present inventive concept there is provided a light distribution device comprising a waveguide comprising a light coupling portion for light propagation, and a slab layer comprising a light coupling edge arranged at a boundary of the slab layer, configured for light propagation.
The light coupling portion extends alongside and at a distance from the light coupling edge, forming a gap therebetween.
The light distribution device is configured to allow light in the waveguide to be coupled into the slab layer across the gap.
The slab layer is configured to propagate light coupled into the slab layer such that an interference pattern is formed in the slab layer, and for control of the interference pattern.

14 Claims, 6 Drawing Sheets

(51) Int. Cl.
   *G01N 21/64* (2006.01)
   *G02B 6/00* (2006.01)
   *G02B 21/08* (2006.01)
   *G02B 21/10* (2006.01)
   *G02B 21/16* (2006.01)

(52) U.S. Cl.
   CPC ........... *G02B 21/082* (2013.01); *G02B 21/10* (2013.01); *G02B 21/16* (2013.01)

(56) References Cited

U.S. PATENT DOCUMENTS

| | | |
|---|---|---|
| 6,836,601 B2 | 12/2004 | Tsarev |
| 2012/0294037 A1 | 11/2012 | Holman et al. |
| 2019/0369376 A1 | 12/2019 | Netz et al. |
| 2019/0383743 A1 | 12/2019 | Van Dorpe et al. |
| 2021/0109334 A1 | 4/2021 | Ahluwalia et al. |

OTHER PUBLICATIONS

Christandl, et al., "One- and two-dimensional optical lattices on a chip for quantum computing", Physical Review A 70, 032302 (2004).

Kim, et al., "Photonic waveguide to free-space Gaussian beam extreme mode converter", Light: Science & Applications (2018) 7:72.

Helle, et al., "Structured illumination microscopy using a photonic chip", Nature Photonics, vol. 14, Jul. 2020, 431-438.

Extended European Search Report for Application No. 21216417-2 dated Jun. 13, 2022.

LIGHT DISTRIBUTION DEVICE, ILLUMINATION SYSTEM AND IMAGING SYSTEM FOR IMAGING OF SAMPLES WITHIN MICROSCOPY

CROSS-REFERENCE TO RELATED APPLICATIONS

The present application claims the benefit of and priority to EP Patent Application Serial No. 21216417.2, filed Dec. 21, 2021, the entire contents of which is incorporated herein by reference.

TECHNICAL FIELD

The present inventive concept relates to a light distribution device, an illumination system, and an imaging system, for illumination of a sample during imaging. In particular, the present inventive concept relates to high and super resolution microscopy.

BACKGROUND

Fluorescence microscopy is commonly used for studying samples in cell and molecular biology. The sample may be prepared by providing a fluorescent substance (fluorophore), that may be selectively bound to a part of the sample that is to be analyzed. Alternatively, an intrinsic fluorescence of the sample may be used in exciting fluorescent light from the sample.

Fluorescence microscopy may for instance be used in DNA sequencing. Although DNA sequencing has traditionally been performed in specialized locations using large, expensive equipment, there is a growing interest in enabling DNA sequencing in smaller laboratories and in hospital settings.

Resolution of fluorescent imaging techniques is intrinsically limited by the diffraction limit. Therefore, there is an interest in super-resolution techniques for improving resolution, enabling more detailed imaging of objects and also enabling objects, such as DNA sequences to be more densely arranged while being imaged. However, super-resolution techniques normally suffer from bulky optical setups and, hence, are expensive.

It is presently known to use techniques for selectively exciting fluorophores that are surface bound. For instance, using total internal reflection microscopy (TIRF), evanescent excitation may be used for exciting only a thin portion of a sample at the surface of the sample holder. The evanescent excitation is based on a small portion of light escaping a surface in which total internal reflection occurs and intensity of the light will very quickly decrease with distance from the surface. Thus, a high vertical resolution may be obtained using TIRF illumination. The use of a standard microscope in combination with an optical chip with a waveguide providing a strong evanescent field used for molecular fluorescence excitation, enables chip-based fluorescence microscopy. By means of multimode interference patterns, structured illumination may induce spatial fluorescence intensity variations that enable high and super resolution imaging. A field-of-view may be flexibly scaled by directly switching magnification/numerical aperture of an objective lens of the fluorescence imaging. However, the generation of structured illumination patterns in a planar photonic chip requires a large footprint to embed the required photonic integrated circuit components. Moreover, the approach of using structured illumination requires good wavefront characteristics. Deviations from planar wavefronts will negatively impact the imaging performance of the device. Thus, there is a need in the art for improved illumination solutions for imaging within microscopy.

SUMMARY

An objective of the present inventive concept is to mitigate, alleviate or eliminate one or more of the above-identified deficiencies in the art and disadvantages singly or in any combination. These and other objectives are at least partly met by the invention as defined in the independent claims. Preferred embodiments are set out in the dependent claims.

According to a first aspect of the present inventive concept there is provided a light distribution device comprising:
  at least one waveguide configured for propagation of light along an extension of the waveguide, said at least one waveguide comprising an elongated light coupling portion;
  a slab layer extending in a plane, the slab layer comprising at least one light coupling edge arranged at a boundary of the slab layer in the plane, said slab layer being configured for propagation of light in the plane;
  wherein the light coupling portion of the at least one waveguide extends alongside and at a distance from the at least one light coupling edge, forming a gap between the light coupling portion and the at least one light coupling edge;
  wherein the light distribution device is further configured to allow at least some of the light being propagated in the at least one waveguide to be coupled into the slab layer through the at least one light coupling edge across the gap,
  wherein the slab layer is configured to propagate the light coupled into the slab layer from the at least one waveguide such that an interference pattern is formed by interference of light in the slab layer; and
  wherein the light distribution device is configured for control of the interference pattern by tuning at least one of a phase, a wavelength, an amplitude, or a polarization of light propagated in the at least one waveguide and/or by tuning a medium property of the slab layer and/or the at least one waveguide and/or, in case the light distribution device comprises a plurality of waveguides including the at least one waveguide, by control of active waveguides among the plurality of waveguides.

According to a second aspect of the present inventive concept there is provided an illumination system for illumination of a sample, the illumination system comprising:
  a light distribution device according to the first aspect;
  at least one light source being configured to generate light, and to provide light to the at least one waveguide;
  wherein the illumination system is further configured such that the interference pattern has an evanescent light field outside the slab layer, wherein the evanescent light field of the interference pattern is configured to illuminate a sample in close relation to the slab layer;
  the illumination system further comprising a controller configured to control forming of the interference pattern in the slab layer by interference of the light being propagated therein, wherein the interference pattern comprises at least one element of constructive interference for selectively illuminating a portion of the sample;

wherein the controller is configured to sequentially change the interference pattern in relation to the sample such that different portions of the sample are illuminated.

According to a third aspect of the present inventive concept there is provided an imaging system comprising:

an illumination system according to the second aspect;

a detector comprising an array of light sensitive areas, the detector being configured to detect light from the sample, wherein the detector is arranged on a common substrate with the slab layer;

wherein the detector is configured to sequentially detect light from different portions of the sample, following the sequentially changing of the interference pattern by the controller.

By the term "light source" is here meant any unit, device and/or element at which light is generated. By way of example, the light source may be, but is not limited to a laser, a laser diode, a light emitting diode, an incandescent light source, a fluorescent light source, or a combination thereof. In this context the term "light" should be allowed a wide interpretation, not limited to visible electromagnetic radiation but may also include for example ultra-violet light and infra-red light.

By the term "light sensitive area" is here meant an area reacting to light impinging onto the area, by generating an electrical signal as a response to the light intensity. An array of light sensitive areas may be arranged on a detector, configured to allow read-out of the electrical signals representing light for image acquisition. By way of example, an array of light sensitive areas may be in the form of pixels on image detectors such as charge-coupled devices (CCD) and complementary metal oxide semiconductors (CMOS).

By the term "waveguide" is here meant any unit, device and/or element within which light may be guided, and within which propagation is restricted to a single direction, thereby providing propagation with low loss. By way of example, light may be reflected on inner walls of the waveguide by total internal reflection or by means of a reflective coating provided on the walls of the waveguide. Given as non-limiting examples, the waveguide may be a transparent dielectric waveguide or an optical fiber. It is conceivable that the light distribution device may have at least one waveguide such as more than one waveguide. Each of the waveguides may be connectable to a light source, which may be the same light source for all waveguides, or it may be different light sources.

By the term "slab layer" is here meant any unit, device and/or element comprising a light guiding medium having a planar shape such that the light guiding medium extends in two perpendicular directions, whereas the light guiding medium in a third direction, perpendicular to the plane, is restricted to extending only a fraction of the extension in the other two directions, essentially forming a thin plane of the light guiding medium. Light entering the plane may be guided in all directions within a plane.

Given as a non-limiting example, the at least one waveguide and the slab layer may be arranged as parts of a photonic integrated circuit.

At least some of the light being propagated in the at least one waveguide may be leaked across the gap between the at least one light coupling portion and the at least one light coupling edge, thereby being coupled into the slab layer. The light being coupled into the slab layer may continue to propagate in a certain direction as a light beam in the slab layer.

It is conceivable that the slab layer comprises at least one light coupling edge arranged at a boundary of the slab layer, such as more than one light coupling edge. Each of the light coupling edges may have a light coupling portion of a waveguide extending alongside, such that light from the waveguides may be coupled into the respective light coupling edges.

An angle at which the light beam is coupled into the slab layer may be tuned, such that the light beam may propagate with the desired direction in order to reach an interference region. Given as a non-limiting example, the tuning of the angle may be achieved by varying a width of the waveguide. Given as another non-limiting example, the tuning of the angle may be achieved by varying an effective refractive index of the waveguide mode. This may be achieved by letting the waveguide be a sub-wavelength grating waveguide and engineering the effective refractive index of the waveguide by tuning the period and duty-cycle of the sub-wavelength grating. By a "sub-wavelength grating waveguide" is here meant a waveguide comprising small, detached blocks, each with a size in a sub-wavelength range. The period and duty-cycle are two parameters determining the spacing and the size of the sub-wavelength blocks. These parameters determine the effective refractive index of the waveguide and thereby also the angle of the beam going into the slab layer.

By tuning the angle, the light beam in the slab layer may be directed towards the interference region of the slab layer. At the interference region, the light beams in the slab layer meet to form the interference pattern. From the interference region the evanescent light field of the interference pattern may illuminate a sample in close relation to the slab layer.

The width of the light beam in the slab layer is related to the gap between the at least one waveguide and the slab layer. Thus, a narrow light beam being propagated in the waveguide may be expanded in the plane of the slab layer to a wider light beam in the slab layer.

It should be noted that it is possible to also tune the angle of the light beam in the slab layer by varying the gap between the light coupling portion and the at least one light coupling edge. However, in doing so also the width of the light beam in the slab layer will be modified.

It should be realized that tuning of the angle may be performed at manufacturing of the light distribution device. Thus, the light distribution device may be designed at manufacturing in order to provide a desired angle at which the light beam will be coupled into the slab layer. For instance, the width of the waveguide, the effective refractive index of the waveguide mode, and/or the gap between the light coupling portion and the at least one light coupling edge may be selected during manufacturing to select an angle at which the light beam will be coupled into the slab layer, such that the angle is tuned.

It should be understood that a distance between the light coupling portion and the at least one light coupling edge forming the gap may be the same at different positions along the light coupling portion, such that a gap profile between the light coupling portion and the at least one light coupling edge is uniform. Alternatively, the distance between the light coupling portion and the at least one light coupling edge forming the gap may be different at different positions along the light coupling portion, such that the gap profile between the light coupling portion and the at least one light coupling edge is non-uniform.

Interference of light in the slab layer may occur where light beams meet in the slab layer, such as at the interference region. Interference of light may occur between a light beam coupled into the slab layer and its reflection, or, if the at least one waveguide comprises a plurality of waveguides, may occur between light beams from the active waveguides, or a combination thereof.

The light distribution device is configured for control of the interference pattern by tuning at least one of a phase, a wavelength, an amplitude, or a polarization of light propagated in the at least one waveguide. In case the light distribution device comprises a plurality of waveguides, tuning may be performed for light in some of the waveguides or all waveguides. By the present arrangement, the interference pattern in the slab layer may be altered to provide an interference pattern comprising at least one element of constructive interference for selectively illuminating a portion of the sample. By way of example, the relative phase difference may determine the position of the interference fringes in the interference pattern.

Alternatively or additionally, control of the interference pattern may be provided by tuning a medium property of the slab layer and/or the at least one waveguide. By way of example, the light distribution device may be configured to control a refractive index of the slab layer and/or in the at least one waveguide. A change of refractive index of the medium may result in change of wavelength of the light therein.

In case the light distribution device comprises a plurality of waveguides, the interference pattern may be controlled by controlling which of the waveguides of the plurality of waveguides are active, i.e. through which waveguides light is currently being guided. By way of example, such control may be achieved by opening and/or closing inputs to the waveguides of the plurality of waveguides, or by switching light sources coupled to the waveguides on and/or off.

In the illumination system according to the second aspect, the controller is configured to sequentially change the interference pattern in relation to the sample such that different portions of the sample are illuminated.

The imaging system according to the third aspect, is configured to control forming of an interference pattern in the slab layer, such that the interference pattern may be configured to select a portion of the sample being imaged. By sequentially changing the interference pattern in relation to the sample, different portions of the sample may be illuminated in sequence. The sequential change of the interference pattern by the controller is synchronized with the sequential detection of light from the sample made by the detector. Thus, the imaging system may be able to acquire a plurality of images of the sample with the different interference patterns, and to combine image information acquired in relation to different interference patterns such that an image of the entire sample may eventually be formed.

The light distribution device may be configured such that the at least one element of constructive interference of the interference pattern may be very small. By way of example, elements of constructive interference may be generated having a size of up to 1 cm. However, by way of further example, elements of constructive interference may be generated having a size in the range of 100 nm-300 µm. In other words, elements of constructive interference may be generated having a surface area in the range of for example 0.008 $\mu m^2$-0.09 $\mu m^2$. By way of further example, elements of constructive interference may have a periodicity in the range of 100 nm-100 µm. However, it should be understood that the elements of constructive interference are by no means limited to the mentioned size range, surface area range, or periodicity range. The examples are merely given to provide understanding to the reader that an element of constructive interference is typically very small. Thus, the array of light sensitive areas may sequentially detect light from the sample in the form of a set of images such that the set of images may be combined into one single super-resolution image of the sample, using a very compact set-up. Given as a non-limiting example, the total imaged field-of-view may be in the range of 100 µm×100 µm to 1 cm×1 cm.

The use of light propagating through total internal reflection in the slab layer allows the sample to be illuminated using the evanescent field of the propagated light outside the slab layer. Since an intensity of the evanescent field quickly decreases with distance from the slab layer, this implies that only samples or portions of samples arranged very close (in the order of 0-200 nm) to the slab layer will be illuminated by the evanescent field. Hence, the use of the slab layer sets a vertical resolution above the slab layer.

The light illuminating the sample may be scattered by the sample so as to reach the array of light-sensitive areas on the detector. By way of example, the light may be elastically scattered by the sample. Alternatively, the light may induce fluorescence in the sample, such that light in the form of fluorescence may be emitted from the sample which may subsequently be detected by the detector. Given as a non-limiting example, the imaging system may be configured to perform fluorescence microscopy, wherein positions of fluorophores in a high-density array may be determined using the imaging system.

An advantage of the light distribution device is that generation of a structured illumination pattern by the present arrangement may be provided at a smaller footprint size than by using conventional techniques. This advantage is particularly important when coupling in a plurality of light beams from a plurality of waveguides into the slab layer. The smaller footprint size is partly due to shorter components, which also have the advantageous effect of lower propagation losses in the device.

Another advantage is that with the light distribution device, light from the at least one waveguide may be coupled into the slab layer at any desired angle such that the useful interference region is maximized. A large portion of the sample may be illuminated with the interference pattern providing a large field-of-view of the imaging system.

Yet another advantage is that coupling of light into the slab layer may be provided with maintained good beam quality. For imaging applications using structured illumination, deviations from a parallel wavefront may negatively impact the imaging performance of the imaging device. By the present arrangement, a light beam in the slab layer, having a near-flat intensity profile with minimal deviations from the desired beam intensity, as well as minimal distortions to the phase front, may be provided. This may reduce aberrations of the interference pattern and improve imaging performance.

Yet another advantage is that by controlling the light properties and/or medium properties and/or active waveguides, a convenient modulation of the interference pattern may be provided. Further, fast modulation of the interference pattern may be provided, allowing fast sequential imaging of different illuminated portions of the sample, reducing the time required for acquiring data of the full sample.

According to an embodiment, a light propagation direction of the light coupling portion coincides with a direction in which the light coupling portion is elongated, such that the light propagating direction extends alongside the at least one light coupling edge.

In other words, the light in the light coupling portion propagates alongside the slab layer, and thus not towards the slab layer. Light from the waveguide being coupled into the slab layer is an effect of leakage across the gap between the light coupling portion and the at least one light coupling edge.

This implies that the light distribution device may provide a small footprint of the light coupling portion and the light coupling edge, as these may be arranged to extend alongside each other.

According to an embodiment, the slab layer is configured to propagate the light coupled into the slab layer from the at least one waveguide such that a width of a cross-section of the light in the slab layer, is larger than a width of a cross-section of the light in the waveguide.

Thus, when a light beam propagating in the at least one waveguide is coupled into the slab layer, the width of the light beams cross-section is expanded. The width is expanded in the plane of the slab layer. In other words, the width of the light beam coincides with the plane of the slab layer. The light beam is however not expanded in the light beam's cross-sectional direction being perpendicular to the plane, here referred to as the height of the cross-section. Since the slab layer is thin in the height direction compared to the slab layer dimensions in the two directions in the plane, expansion of the light beam in the height direction is restricted.

An advantage with this embodiment is that in order to expand the light beam being coupled into the slab layer, the light coupling portion of the waveguide may pass close to the at least one light coupling edge. This should be seen in contrast to conventional beam expanders that rely on making a divergent light beam which linearly expand the light beam and thus usually requires a significant length in order to output a width being an order of magnitude larger than the original width of the light beam, and may also negatively affect the beam quality. However, by light beam expansion using the light distribution device, a corresponding expansion may be achieved at a much smaller distance, allowing a significant reduction of size of the device, while maintaining good beam quality.

An advantage with this embodiment is that light with a structured illumination pattern may be distributed over a large area. Thus, when the light distribution device is used for illumination of a sample in an imaging application, a large field-of-view may be provided.

According to an embodiment, the light coupling portion of the at least one waveguide extends in parallel with the at least one light coupling edge of the slab layer.

However, it should be understood that other alternatives to the light coupling portion being parallel with the light coupling edge are possible. For example, the light coupling portion may be inclined with respect to the light coupling edge. Alternatively, the light coupling portion may have a curved shape such that not all parts of the light coupling portion can be simultaneously parallel with the light coupling edge.

According to an embodiment, the at least one waveguide further comprises an input portion extending in the plane in a direction towards the light coupling edge of the slab layer, the input portion being optically connected at an angle to an input end of the light coupling portion;

wherein the input portion is configured to receive light and to direct light along the input portion to the input end of the light coupling portion such that light in the input portion propagates towards the light coupling edge of the slab layer, and upon reaching the input end of the light coupling portion light is redirected to propagate in the light coupling portion alongside the at least one light coupling edge of the slab layer.

An advantage of this embodiment is that a compact light coupling from the at least one waveguide into the slab layer may be provided.

According to an embodiment, a distance between the light coupling portion and the at least one light coupling edge in the gap is different at different positions along the light coupling portion, such that a gap profile between the light coupling portion and the at least one light coupling edge is non-uniform.

By way of example, the distance between the light coupling portion and the at least one light coupling edge may be alternatingly larger and smaller along the light coupling portion to form an irregular gap profile. By the present arrangement the beam coupled into the slab layer may be patterned as an alternative to being uniform.

An advantage of this embodiment is that a single waveguide may generate an illumination pattern in the slab layer.

According to an embodiment, the gap profile has a sinusoidal shape.

Different gap profiles may provide different cross-sectional intensity profiles of the light in the slab layer. Thus, by selection of a certain gap profile, a desired cross-sectional profile shape set by the power distribution in the waveguide may be transferred to the slab layer. Expressed differently, by altering the gap profile, the cross-sectional intensity profiles of the light in the slab layer may be controlled. By the present arrangement the beam coupled into the slab layer may be periodically patterned. By way of example, a gap profile having a sinusoidal shape may produce a periodic illumination pattern of spots.

An advantage of this embodiment is that a cross-sectional intensity profile suitable for the intended application may be provided. By way of example, a near-constant intensity profile over a large region is a preferable power density profile when generating interference patterns in structured illumination microscopy. By the present arrangement, a top-hat profile or a super-gaussian profile with a near-constant intensity profile over a large region may be provided. By controlling the gap profile, also better control of the interference pattern may be provided.

Another advantage is that a single waveguide may generate a periodic illumination pattern in the slab layer. By the present arrangement the need for more than one waveguide may be eliminated.

According to an embodiment, the light distribution device further comprises a cladding layer in the gap between the light coupling portion of the at least one waveguide and the at least one light coupling edge of the slab layer, the cladding layer being configured to control the coupling of light between the at least one waveguide and the slab layer.

The cladding layer may be made of a transparent optical material with a refractive index selected such that the coupling of light between the at least one waveguide and the slab layer is enhanced.

It should be understood that, in order to keep the light propagating in the waveguide, the refractive index of the cladding must be substantially lower than the refractive index of the waveguide. On the other hand, if the refractive index of the cladding is close to the refractive index of the waveguide and the slab layer, a stronger coupling of light from the waveguide to the slab layer may be achieved.

Given as non-limiting examples, the cladding may be made of $SiO_2$, plastics, liquids, air, vacuum, and/or liquid crystal. It is conceivable that the refractive index of the cladding may be controlled by the application of an electric field.

Given as non-limiting example, the waveguide and/or the slab layer may be made of Silicon, SiN, $TiO_2$, and/or NbO.

An advantage of this embodiment is that better light coupling from the waveguide to the slab layer may be provided. Given as non-limiting example, better coupling may provide more light being coupled into the slab layer, or a more uniform intensity profile being coupled into the slab layer.

According to an embodiment, the at least one waveguide and the slab layer are arranged on a common substrate.

An advantage is that a compact and robust photonic integrated circuit may be provided. By the use of a minimum of movable parts, such an integrated component may provide reliable operation even for large scale use.

Another advantage is that the at least one waveguide and the slab layer may be pre-aligned during production. Pre-alignment may ensure specific properties of the integrated component, such as the angle and the width of the light coupled into the slab layer from the at least one waveguide. This in turn may enable generation of predetermined and known interference patterns in the slab layer, which facilitates image reconstruction when the light distribution device is used as part of the illumination in imaging applications. By the present arrangement, a light distribution device that is easy for a user to operate may be provided.

According to an embodiment, the at least one waveguide comprises a first waveguide and a second waveguide; wherein the at least one light coupling edge comprises a first light coupling edge and a second light coupling edge; and wherein a light coupling portion of the first waveguide extends alongside the first light coupling edge, and a light coupling portion of the second waveguide extends alongside the second light coupling edge; and wherein the light distribution device is further configured to form the interference pattern by interference of light being coupled into the slab layer, from at least the first waveguide to the first light coupling edge, and the second waveguide to the second light coupling edge.

An advantage with a light distribution device with more than one waveguide for coupling light into the slab layer may be more flexibility and versatility in generating various interference patterns in the slab layer. With different waveguides, light in the waveguides may be tuned to have different properties, such as phase, wavelength, amplitude, or polarization which may allow a high level of control of the interference pattern.

According to an embodiment, the light distribution device further comprises a reflective element; and wherein the light distribution device is configured to direct light coupled from the at least one waveguide into the slab layer, in the plane from the at least one light coupling edge to the reflective element; and wherein the reflective element is configured to reflect at least part of the light back into the slab layer as reflected light, whereby the light and the reflected light form an interference pattern by interference in the slab layer.

An advantage is that forming an interference pattern using a single waveguide may be enabled. A light distribution device comprising a single waveguide may be produced at a low cost and may be easy for a user do operate. It should however be realized that reflective element(s) may also be used with the light distribution device comprising a plurality of waveguides, so as to use reflected light to contribute to an interference pattern formed by light being coupled into the slab layer from a plurality of waveguides.

According to an embodiment, the illumination system further comprises at least one influencing device connected to the controller, the influencing device being configured for tuning, in response to a signal from the controller, at least one of a phase, a wavelength, an amplitude, or a polarization of the light from the at least one light source being provided to the at least one waveguide, and/or for tuning a medium property of the slab layer and/or the at least one waveguide thereby controlling the interference pattern in the slab layer.

In the present context, the influencing device may be configured to affect propagation of light through the at least one waveguide, which may be used for tuning at least one of a phase, a wavelength, an amplitude, or a polarization of light. For instance, the influencing device may affect a refractive index of the waveguide (or a material close to the waveguide), such as by thermal or opto-electro-mechanical modulation. The influencing device may alternatively change a length of the waveguide, e.g. by the waveguide being formed on a membrane which may be micro-electro-mechanically controlled.

By tuning a phase, a wavelength, an amplitude, or a polarization of light in at least one waveguide, the interference pattern formed by coupling the light into the slab layer may be controlled. The at least one influencing device may thus be controlled in order to sequentially change the interference pattern.

According to an embodiment, in case the light distribution device comprises a plurality of waveguides including the at least one waveguide, the controller is configured for control of active waveguides among the plurality of waveguides, thereby controlling the interference pattern in the slab layer.

Effects and features of the second aspect are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Similarly, effects and features of the third aspect are largely analogous to those described above in connection with the first and second aspects. Embodiments mentioned in relation to the first and second aspects are largely compatible with the third aspect.

Other objectives, features and advantages of the present inventive concept will appear from the following detailed disclosure, from the attached claims as well as from the drawings.

BRIEF DESCRIPTIONS OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 1 illustrates a light distribution device.

FIG. 2A schematically illustrates further details related to the light coupling from one of the waveguides to a slab layer, in the light distribution device.

Figure 3A:
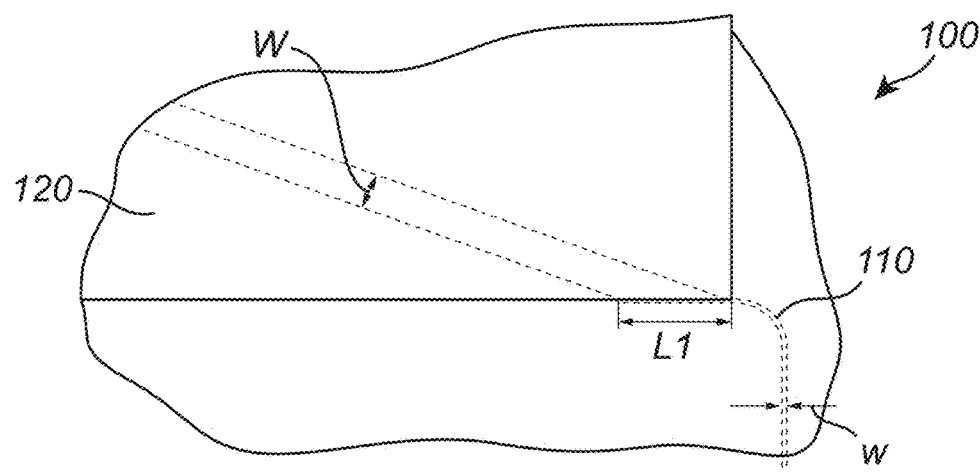
Figure 3B:
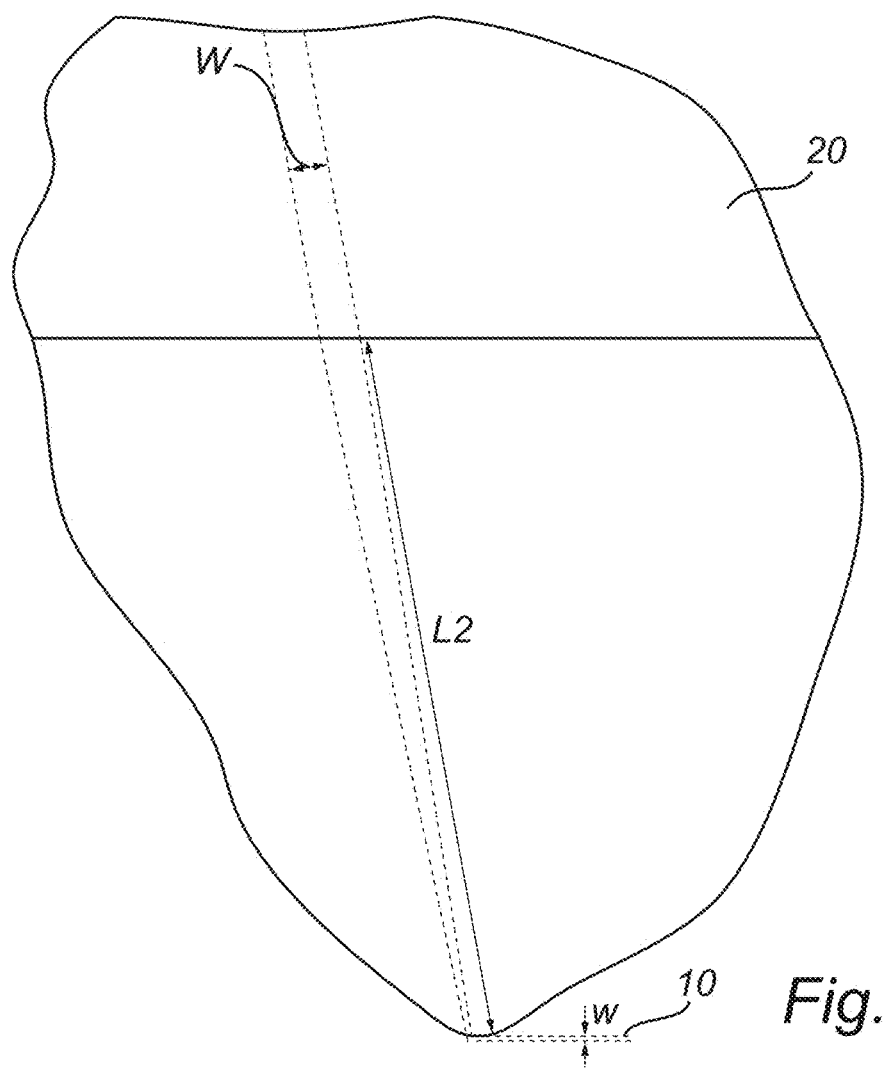

FIG. 3A-B schematically illustrates an advantage with using the coupling of light from a waveguide into a slab layer as a beam expander, compared to conventional adiabatic taper beam expansion.

Figure 4:
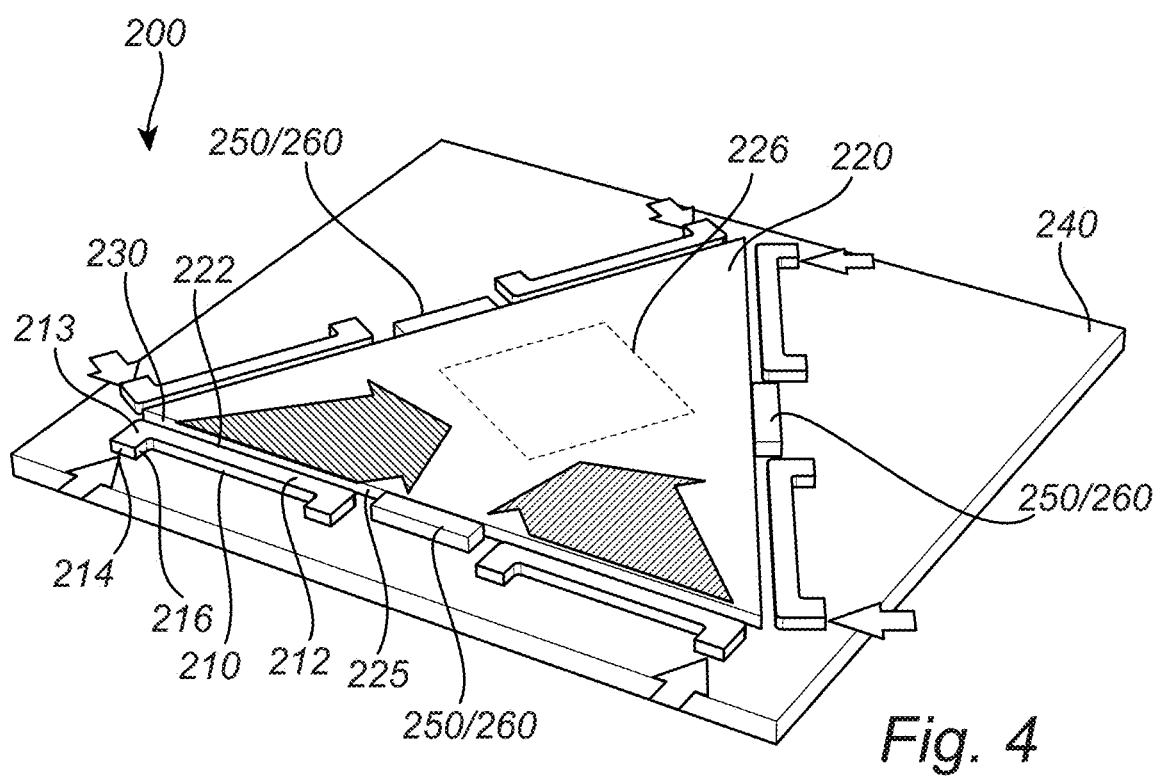

FIG. 4 illustrates a light distribution device comprising a triangularly shaped slab layer.

Figure 5:
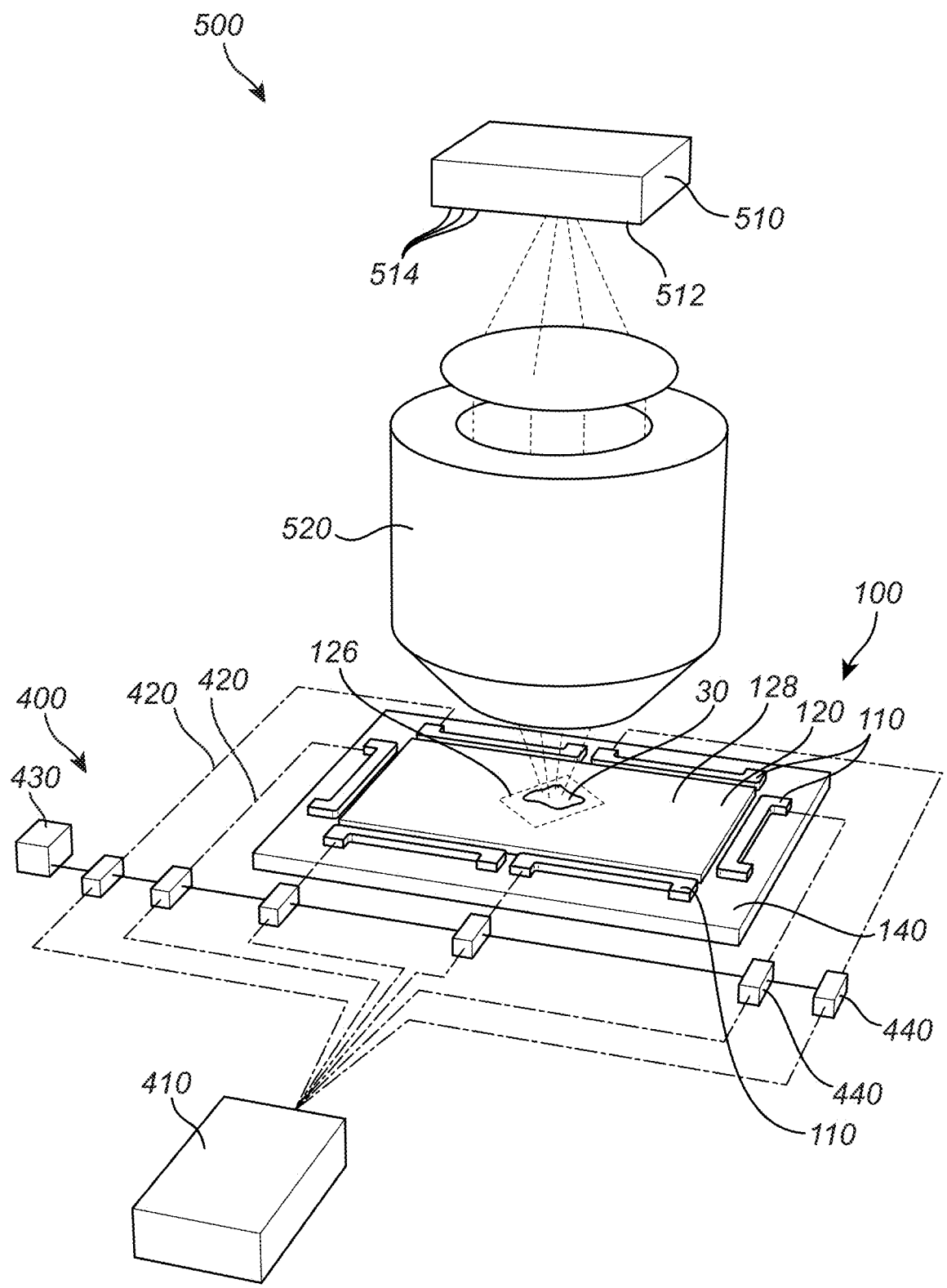

FIG. 5 illustrates an illumination system as part of an imaging system configured to illuminate a sample by means of the illumination system and detect light from the sample.

DETAILED DESCRIPTION

In cooperation with attached drawings, the technical contents and detailed description of the present inventive concept are described thereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

Figure 1:
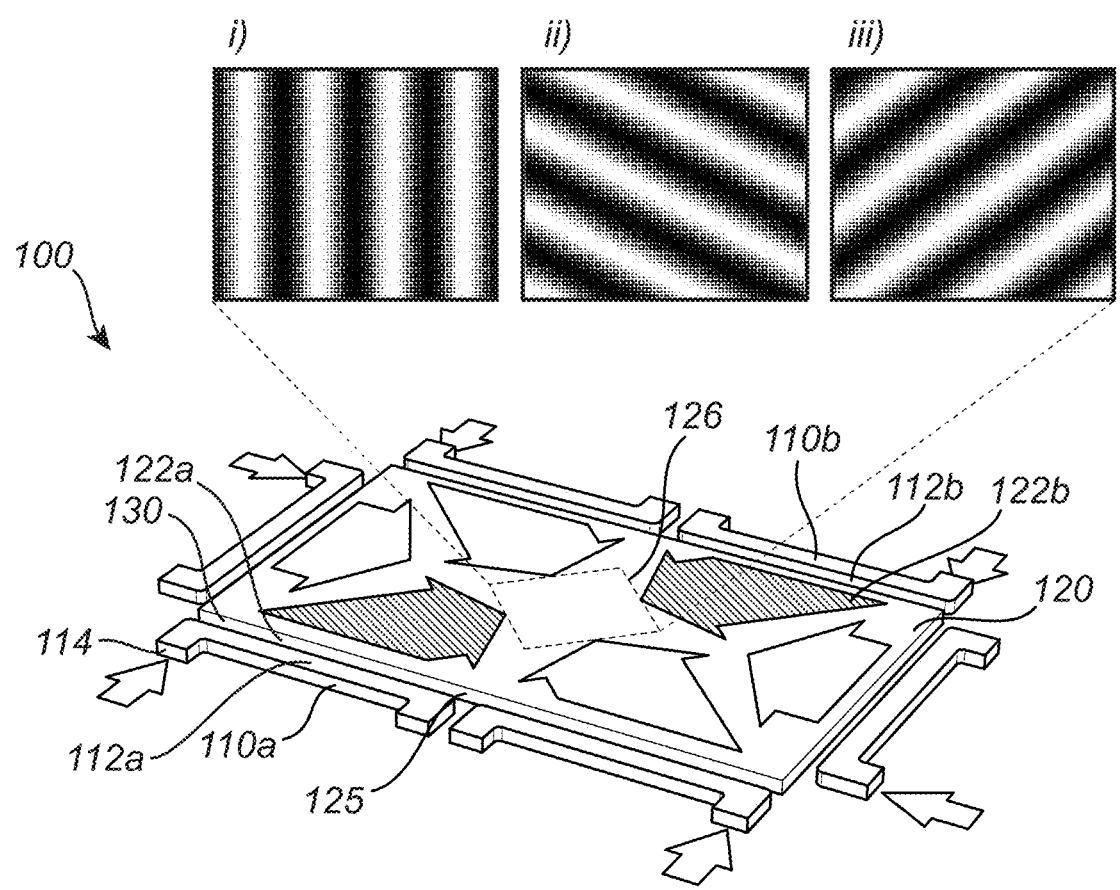

FIG. 1 illustrates a light distribution device 100 according to an embodiment. The light distribution device 100 comprises six waveguides 110. Each waveguide 110 is made of a transparent optical material. Each waveguide 110 is configured for propagation of light along an extension of the waveguide 110. Light from a light source (not shown) may be received at an entrance 114 of each waveguide 110 and propagated from the entrance 114 along the extension of the waveguide. Each waveguide comprises a light coupling portion 112.

The light distribution device 100 further comprises a slab layer 120. The slab layer 120 is a planar structure extending in a plane in two directions. In FIG. 1 the slab layer 120 is illustrated as having a rectangular shape in the plane, however it should be understood that the slab layer 120 may have different shapes as well, other than being rectangular. In the direction perpendicular to the plane, the slab layer 120 has a limited extension. The extension in the direction perpendicular to the plane may be equal or similar to the extension of the waveguide 110 in the same direction. The slab layer 120 is made of a transparent optical material, and is configured for propagation of light in the plane.

At a boundary 125 of the slab layer 120 in the plane, the slab layer 120 comprises light coupling edges 122. The waveguides 110 are arranged in the plane around the boundary 125 such that the light coupling portions 112 of the waveguides 110 extend alongside and at a distance from one of the light coupling edges 122 of the slab layer 120. By the present arrangement a gap 130 is formed between the light coupling portions 112 and the light coupling edges 122.

The waveguides 110 and the slab layer 120 are arranged and configured to allow at least some of the light being propagated in the waveguides 110 to be coupled into the slab layer 120 from each of the light coupling portions 112 through the corresponding light coupling edges 122 across the gap 130. In other words, at least part of the light beam propagating in each waveguide 110 may leak across the gap 130 into the slab layer 120.

The slab layer 120 is configured to propagate the light coupled into the slab layer 120 from each of the waveguides 110. The light from each of the waveguides is directed towards an interference region 126 of the slab layer 120 such that an interference pattern is formed by interference of light in the interference region 126.

In the light distribution device 100, the waveguides 110 are arranged with respect to the slab layer 120 such that three opposing light beam pairs are formed. Each pair comprises a first waveguide 110a and a second waveguide 110b. The light coupling portion 112a of the first waveguide 110a extends alongside a first light coupling edge 122a of the slab layer 120. Further, the light coupling portion 112b of the second waveguide 110b extends alongside a second light coupling edge 122b of the slab layer. By the present arrangement an interference pattern may be formed by interference of light being coupled into the slab layer 120 from at least the first waveguide 110a to the first light coupling edge 122a, and the second waveguide 110b to the second light coupling edge 122b.

The interference pattern formed when light is coupled into only one such pair, may consist of equidistant bright and dark interference fringes, as shown in i), ii), and iii) respectively, in FIG. 1. By activating two or more pairs of waveguides 110, more complex interference patterns may be generated.

It should be understood that forming opposing light beam pairs in the slab layer 120 is not strictly necessary by the inventive concept, but also other alternatives are possible. By way of example, an interference pattern may be formed by interference between the light coupled from a single waveguide 110 into the slab layer 120 and its reflection, or between the light coupled from two waveguides 110 not forming an opposing pair. More details on how the interference may be achieved are given in relation to some of the following figures.

It is realized that by altering a property of the light waves or the medium in which the light waves propagate, the interference pattern may be altered. This is an advantage for example when the light distribution device 100 is used as illumination in an imaging system for imaging a sample arranged in close relation to the slab layer 120, such as on top of the slab layer 120. The light distribution device 100 is a compact device for generating structured illumination for illuminating different portions of the sample. By altering a property of the light wave or of the medium, the structured illumination may be changed into different patterns illuminating different portions of the sample, and in this manner build up a high-resolution image of the full sample. The present arrangement allows control of the interference pattern by tuning a phase, a wavelength, an amplitude, or a polarization of light propagated in the waveguides 110. Such tuning may be realized by arranging an influencing device such as a phase shifter, a wavelength shifter etc., in the path of the light from the light source, prior to the entrance 114 of the individual waveguides 110. Such influencing devices may either be part of the light distribution device 100 or be separate parts connectable to the light distribution device 100. Alternatively and/or additionally, control of the interference pattern may be achieved by tuning a medium property of the slab layer 120 and/or the waveguides 110. In case the arrangement comprises a plurality of waveguides 110 as shown in FIG. 1, control of the interference pattern may be achieved by control of active waveguides 110. Such control may be in the form of switches opening and closing the individual entrances 114 of the waveguides 110. More details on control of the interference are given in relation to some of the following figures.

Figure 2A:
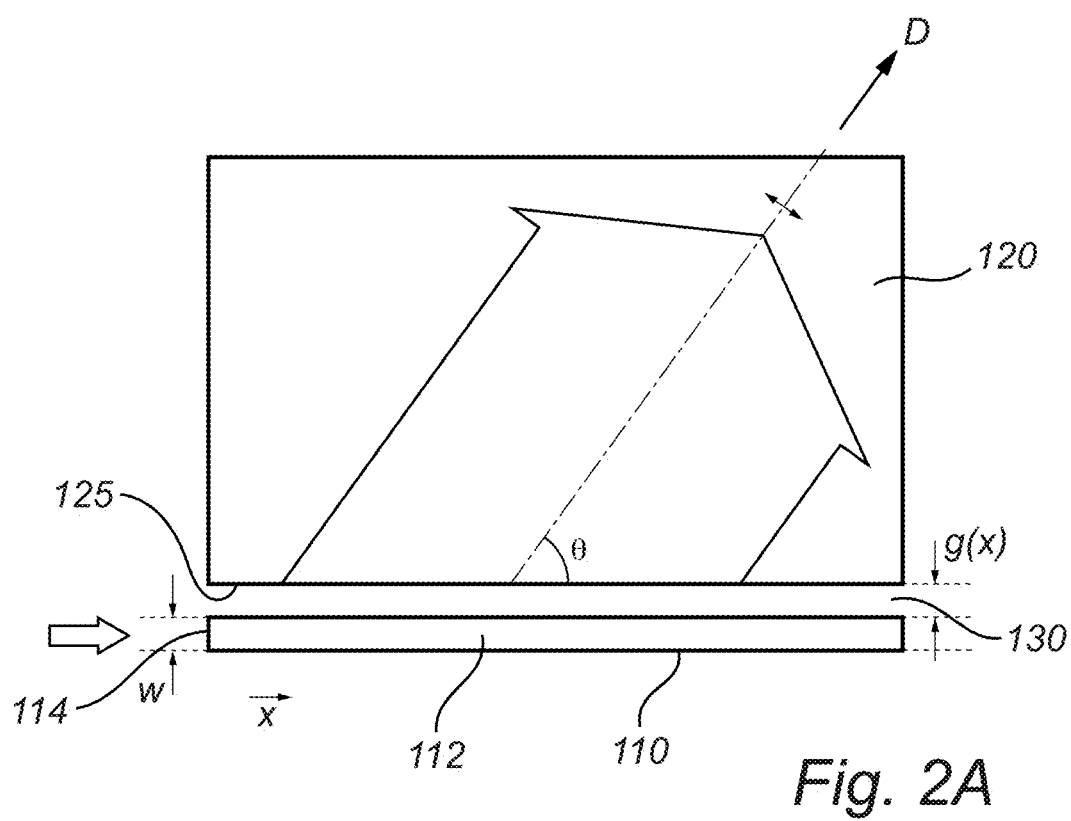
FIG. 2B illustrates a graph showing the angle of light propagation in the slab layer as a function of the width of the waveguide.
FIG. 2C illustrates a graph showing how the gap between the light coupling portion and the light coupling edge may vary along the extension of the light coupling portion.

FIG. 2A schematically illustrates further details related to the light coupling from one of the waveguides 110 to a slab layer 120, in the light distribution device 100. Light from a light source (not shown) may be received at the entrance 114 of the waveguide 110. The light propagation direction in the light coupling portion 112 coincides with a direction in which the light coupling portion 112 is elongated, namely along the x-axis. In this manner the light propagating direction extends alongside the light coupling edge 122 of the slab layer 120.

The slab layer 120 is arranged alongside the light coupling portion 112. More specifically, the light coupling portion 112 of the waveguide 120 extends in parallel with the light coupling edge 122 of the slab layer 120. However, it should be understood that other alternatives to the light coupling portion 112 being parallel with the light coupling edge 122 are possible. For example, the light coupling portion 112 may be inclined with respect to the light coupling edge 122. Alternatively, the light coupling portion 112 may have a curved shape such that not all parts of the light coupling portion 112 can be simultaneously parallel with the light coupling edge 122. By way of example, the light coupling portion 112 and thus the gap 130 profile may have a periodically varying shape, such as a sinusoidal shape.

The light coupling portion 112 of the waveguide 110 extends alongside and at a distance from the light coupling edge 122 of the slab layer 120 forming the gap 130 between the light coupling portion 112 and the light coupling edge 122. The coupling of light across the gap 130 may occur continuously along a significant portion of the light coupling portion 112 and the corresponding light coupling edge 122.

By the present arrangement, a light beam with a collimated, coherent wavefront is propagated in the slab layer 120 with an angle θ with respect to the light coupling edge 122. The angle θ is dependent on the width w of the waveguide 110 such that as the width w of the waveguide 110 gets larger, the angle θ between the light coupling edge 122 and the light propagation direction D in the slab layer 120 becomes smaller.

Figure 2B:
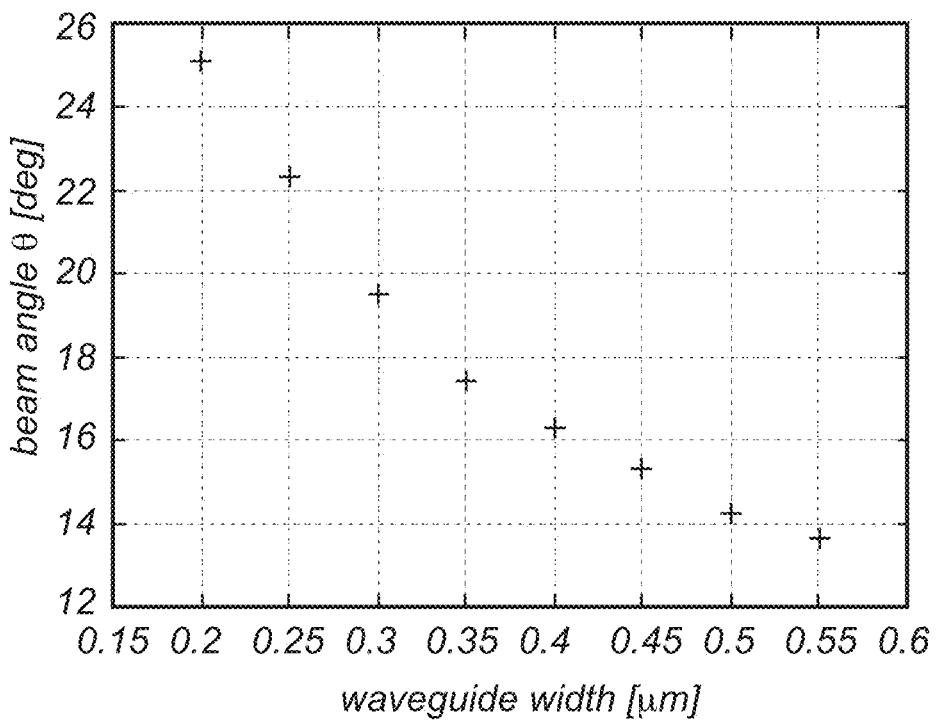

The dependence of the angle θ on the width w of the waveguide 110 may follow the behavior illustrated in the graph of FIG. 2B. Thus, by tuning the width w of the waveguide 110, the angle θ can be altered and thereby a desired direction D of propagation can be obtained. In this manner it may be ensured that the light beam is propagated to a desired interference region of the slab layer 120.

As illustrated in FIG. 2A the slab layer 120 may be arranged with respect to the waveguide 110 to propagate the light coupled into the slab layer 120 from the waveguide 110 such that the width of the cross-section of the light in the slab layer 120, is larger than the width of the cross-section of the light in the waveguide 110. Expressed differently, the narrow light beam of the waveguide 110 may be expanded within the plane of the slab layer 120 when coupled into the slab layer 120. The level of beam expansion is dependent on the distance between the light coupling portion 112 and the light coupling edge 122, i.e. the gap 130. Hence, by tuning the gap 130 the width expansion of the light beam in the slab layer 120 may be altered. It should be understood that although the beam is illustrated in FIG. 2A as being expanded when being coupled from the waveguide 110 into the slab layer 120, expansion is not necessary and so the width of the light beam in the slab layer 120 may be the same as the width of the beam in the waveguide 110.

The possibility of selecting a certain direction of propagation and a width of the light beam in the slab layer 120, in combination with the properties of the collimated, coherent wavefront, may contribute to a stable and controllable interference pattern.

Figure 2C:
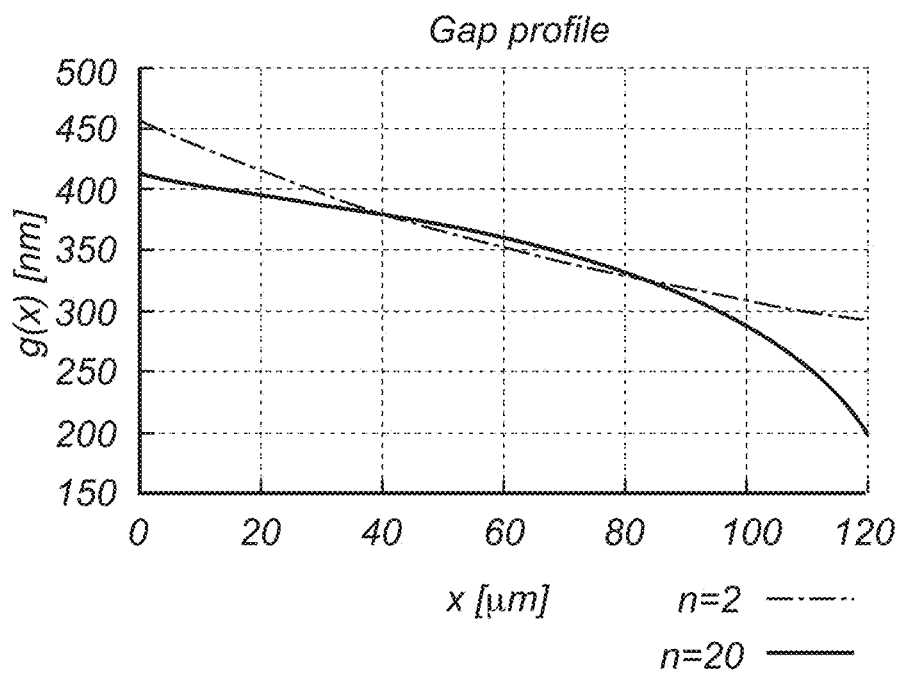

FIG. 2C illustrates a graph showing how the gap between the light coupling portion and the light coupling edge may vary along the extension of the light coupling portion. Although the gap 130 in FIG. 2A is illustrated as being the same along the extension of the light coupling portion, the gap may alternatively be different at different positions. Thus, the distance between the light coupling portion and the light coupling edge in the gap is different at different positions along the light coupling portion, such that a gap profile between the light coupling portion and the light coupling edge is non-uniform.

Due to phase matching property between the waveguide and the slab layer, a profile shape set by the power distribution in the waveguide is transferred to the slab layer. A general gap profile g(x) may be expressed as:

$$g(x) = \frac{-1}{b}\log\left(\frac{1}{a}\frac{f(x)}{1 - \int_{-\infty}^{x} f(\xi)d\xi}\right)$$

where x denotes a position along the extension of the light coupling portion.

The coefficients a and b may be chosen based on numerical mode analysis of the waveguide and will tune the desired slab mode. The coefficients a and b may be found from the exponential power leakage between the waveguide and the slab layer, relating them to the imaginary part of the effective refractive index, $n_{\mathit{eff}}$, by the following expression:

$$\mathrm{Im}(n_{\mathit{eff}}) = a \cdot \exp(-b \cdot g(x))$$

The profile function f(x) of the power density in the slab layer is chosen depending on the application criteria. A super-gaussian profile having a near-constant intensity profile over a large region is a preferable power density profile when generating interference patterns in structured illumination microscopy. The profile function may be expressed as:

$$f(x) = A \cdot \exp\left(-\left(\frac{x^2}{2 \cdot w^2}\right)^n\right)$$

where A is a normalization constant, w is the width of the waveguide and n is the power of the super-gaussian profile.

FIG. 3A-B schematically illustrates an advantage with using the coupling of light from a waveguide into a slab layer as a beam expander, compared to conventional adiabatic taper beam expansion. FIG. 3A illustrates that, by means of the light distribution device 100 the width w of the light beam in the waveguide 110 may be expanded to a width W of the light beam in the slab layer 120. The length required to achieve this beam expansion is here denoted L1. By way of example, the width w of the light beam in the waveguide 110 may be in the range of 0.2-1.2 μm prior to expansion. By way of further example, the width W of the light beam in the slab layer 120 may be in the range of 30-10 000 μm, after expansion. Thus, the light distribution device 100 may easily provide a width expansion of ~25 times or more, with substantially maintained beam quality.

FIG. 3B illustrates beam expansion by conventional adiabatic taper, from a beam width w in a waveguide 10 to a beam width W in a slab layer 20. The adiabatic taper relies on linearly expanding the light beam and thus to achieve the same level of beam expansion by means of conventional adiabatic taper as with the light distribution device 100, the distance between a waveguide 10 and a slab layer 20, were denoted L2, is significantly longer than L1. An adiabatic taper may have a length in order provide a width expansion of up to ~20 times. However, providing larger width expansions in order to generate very wide beams of more than 100 µm with adiabatic tapers is very challenging without losing beam quality. The light distribution device, on the other hand, does maintain a good beam quality for large widths. Further, such beam expansions may be achieved with minimal additional component space of say 1:100 compared to conventional adiabatic taper. Also, beam expansion may be provided along a light coupling edge of the slab layer, wherein the edge is anyway needed in the slab layer such that length of the light coupling portion of the waveguide does not add to the footprint of the light distribution device 100. By means of the light distribution device 100 as part of the illumination of an imaging system, a compact illumination system yet with a large field-of-view may be provided.

FIG. 4 illustrates a light distribution device 200 according to another embodiment comprising a triangularly shaped slab layer 220. The slab layer 220 is arranged onto a top surface of a substrate 240. At the boundary 225 of the slab layer 220, the slab layer 220 comprises light coupling edges 222. Six waveguides 210 are arranged on the substrate 240 around the boundary 225 such that the light coupling portions 212 of the waveguides 210 extend alongside and at a distance from one of the light coupling edges 222. By the present arrangement a gap 230 is formed between the light coupling portions 212 and the light coupling edges 222.

Each waveguide 210 may further comprise an input portion 216 extending in the plane in a direction towards the corresponding light coupling edge 222 of the slab layer 220. The input portion 216 comprises an entrance 214 at which light from a light source may be received. The input portion 216 is optically connected at an angle to an input end 213 of the light coupling portion 212.

Through the entrance 214 the input portion 216 may receive light. The received light may be directed along the input portion 216 to the input end 213 of the light coupling portion 212 such that light in the input portion 216 propagates towards the light coupling edge 222 of the slab layer 220. Upon reaching the input end 213 of the light coupling portion 212 light is redirected to propagate in the light coupling portion 212 alongside the light coupling edge 222 of the slab layer 120.

Similarly as to what was described in relation to FIG. 1 and FIG. 2A, the arrangement of waveguides 210 and slab layer 220 allows at least some of the light being propagated in the waveguides 210 to be coupled into the slab layer 220 from each of the light coupling portions 212 through the corresponding light coupling edges 222 across the gap 230.

Although not strictly necessary for practicing the inventive concept, the light distribution device 200 may comprising a cladding layer in the gap 230 between the light coupling portion 212 of each waveguide 210 and the corresponding light coupling edges 222 of the slab layer 220. The cladding layer may be configured to control the coupling of light between the waveguides 210 and the slab layer 220. By way of example, a cladding layer may be included to enhance the coupling of light such that more light is coupled into the slab layer 220. As an alternative to the use of a cladding layer, the gap may be filled with air, or any other suitable gas, or a vacuum may be provided in the gap 230.

The light coupled into the slab layer 220, from each of the waveguides 210, is propagated through the slab layer 220 towards an interference region 226 such that an interference pattern is formed by interference of light in the slab layer 220. In the light distribution device 200, two waveguides 210 are arranged along each of the three sides of the slab layer 120, forming three light beam pairs, one pair from each of the three sides of the slab layer 220. By activating two or more pairs, complex interference patterns may be generated.

The light distribution device 200 may further comprise absorbing elements 250. Three absorbing elements 250 are illustrated in FIG. 4 being arranged along the boundary 225 in between the light coupling portions 212 of the waveguides 210. More specifically, the absorbing elements 250 are arranged such that the light beams in the slab layer 220, coupled from the different waveguides 210, are incident on an absorbing element 250 when reaching the boundary 225 of the slab layer 220. The absorbing elements 250 are made of a light absorbing material that efficiently absorb the light. In this manner, unwanted light reflections from the boundary 225 may be avoided, which might otherwise reach the interference region 226 and negatively affect the interference pattern, thereby compromising image quality.

Similarly as to what has been described in relation to FIG. 1, the interference pattern generated with light distribution device 200 may be controlled by a number of influencing devices (not shown) in the path of the light from the light source, prior to entry of the light into the waveguides 210. By altering interference pattern, the structured illumination may be changed to illuminate different portions of the sample, and in this manner build up a high-resolution image of the full sample.

As an alternative to the absorption elements 250, reflective elements 260 may be arranged at the same positions along the boundary 225. The light distribution device 200 may be configured to direct light coupled from the waveguides 210 into the slab layer 220, from the light coupling edges 222 to the reflective element 260. The reflective elements 260 may be configured to reflect at least part of the light back into the slab layer 220 as reflected light. When the reflected light would reach the interference region 226 the light and the reflected light may form an interference pattern by interference in the slab layer 220. By the present arrangement, an interference pattern may be generated with only a single waveguide 210 being active. The interference pattern generated by a single light beam being reflected back to the interference region 226, may be controlled by an influencing device configured for tuning e.g. a phase, a wavelength, an amplitude, or a polarization of light propagated in the waveguide 210. In view of the above it should be realized that a light distribution device 200 may comprise a plurality of waveguides 210 but alternatively also a single waveguide 210. Hence, it is conceivable that, instead of the light distribution device 200 comprising six waveguides, the light distribution system 200 may alternatively comprise a single waveguide 210 and a reflective element 260.

FIG. 5 illustrates an illumination system 400 as part of an imaging system 500 for imaging a sample 30. The imaging system 500 is configured to illuminate the sample 30 by means of the illumination system 400 and detect light from the sample 30. The illumination system 400 is herein described as comprising the light distribution device 100, however it should be understood that any light distribution device according to the first aspect of the inventive concept, as for example light distribution device 200, would be equally applicable as part of the illumination system. The light distribution device 100 has been described in relation to FIG. 1-2, the details of which will not be repeated here.

The illumination system 400 further comprises a light source 410, which in the present example is a laser, configured to generate light. The light source 410 emits a light beam which is subsequently split up into six light beams, one for each waveguide 110 in the light distribution device 100. Each of the six light beams is guided to an entrance 114 of a respective waveguide 110. The light beams may be guided by a number of input waveguides 420, optically connected to the entrance 114 of the respective waveguides 110. Light from the waveguides 110 is coupled into the slab layer 120 forming an interference pattern in the interference region 126 of the slab layer 120.

The illumination system 400 is configured such that the interference pattern formed in the slab layer 120 has an evanescent light field outside the slab layer 120. The evanescent light field is based on a small portion of light escaping a surface of the slab layer 120 in which total internal reflection occurs and intensity of the light will very quickly decrease with distance from the surface. This evanescent field may interact with the sample 30 arranged close to the top surface 128 of the slab layer 120 and may thus be used for illuminating the sample 30 selectively illuminating only portions of the sample 30 very close to the top surface 128.

The use of the evanescent field from the slab layer 120 may thus control a vertical resolution of the sample 30 being imaged with the imaging system 500, since only parts of the sample 30 very close to the top surface 128 of the slab layer 120 will be illuminated. Thus, if the sample 30 is arranged in close relation to the slab layer 120, as for example on the top surface 128 of the slab layer 120 above the interference region 126, the evanescent light field of the interference pattern may illuminate the sample 30. The interference pattern comprises at least one element of constructive interference for selectively illuminating a portion of the sample 30.

The illumination system 400 may further comprise a controller 430 configured to control forming of the interference pattern in the slab layer 120 by interference of the light being propagated therein. The controller 430 is configured to sequentially change the interference pattern in relation to the sample 30 such that different portions of the sample 30 are illuminated.

The controller 430 may send a control signal to the light source 410, to control the light emitted by the light source 410. Alternatively, the controller 430 may send control signals to switches at the inputs to the waveguides, such that the inputs are opening and/or closing. By the present arrangement, the controller 430 may control which of the waveguides 110 are active waveguides 110, thereby controlling the interference pattern in the slab layer 120.

The illumination system may comprise a number of influencing devices 440, in the present example six influencing devices 440. The influencing devices may be connected to the controller 430, such that the controller 430 may send a control signal to each of the respective influencing devices 440.

The influencing devices 440 may be configured for tuning, in response to a signal from the controller 430, light being propagated in the respective waveguides 110. The influencing devices 440 may be configured for tuning a phase, a wavelength, an amplitude, or a polarization of the light from the light source 410 being provided to the waveguides 110. Alternatively or additionally, the influencing devices 440 may be configured for tuning a medium property of the slab layer 120 and/or the waveguides 110, thereby controlling the interference pattern in the slab layer 120.

The imaging system 500 may further comprise a detector 510 comprising an array 512 of light sensitive areas 514. The detector 510 may be configured to detect light from the sample 30. The detector 510 may be arranged on a common substrate 140 with the slab layer 120. By way of example, the detector 510 may be arranged between the slab layer 120 and the substrate 140, or the detector 510 may be arranged on the opposite side of the substrate 140 with respect to the slab layer 120. Alternatively, the detector 510 may be arranged on the opposite side of the sample 30 with respect to the slab layer 120, as illustrated in FIG. 5.

Each light-sensitive area 514 is configured to generate a response, such as an electric charge, in proportion to light incident on the light-sensitive area 514. Thus, the light-sensitive area 514 may generate a measurement of intensity of light being emitted by a portion of the sample 30. Thanks to the interference pattern used for illuminating the sample 30, the light detected by the light sensitive area 514 may be associated with the illuminated portion of the sample 30. Thus, a size of the element of constructive interference of the interference pattern may define the resolution of imaging by the array 512 of light-sensitive areas 514.

The array 512 of light-sensitive areas 514 may for example be implemented as a charge-coupled device (CCD) or a complementary metal oxide semiconductor (CMOS) image detector. Analog output from the light sensitive areas 514 may pass an analog-to-digital converter, such that the array 512 of light-sensitive areas 122 may output a digital representation of detected light. The digital representation is suited to be transferred to other entities for processing the detected light and/or being processed within the imaging system 500.

The detector 510 may be configured to sequentially detect light from different portions of the sample 30, following the sequentially changing of the interference pattern by the controller 430. Thus, a plurality of image frames may be acquired in a sequence each of which corresponding to a different interference pattern.

By the present arrangement, interference patterns may be generated having very small elements of constructive interference, thereby providing a very high resolution. By way of example, elements of constructive interference may be generated having a size in the range of 100 nm-10 μm. By sequentially changing the interference pattern, different portions may be illuminated so that light from all portions of the sample 30 may be sequentially detected. The acquired set of images may be used to reconstruct an image of the full sample 30 with super-resolution, i.e. resolution of imaging not limited to the free space diffraction limit.

The inventive concept may be applied in e.g. fluorescence microscopy for studying cell and molecular biology, and for nucleic acid sequencing. However, it should be realized that, in addition to fluorescence microscopy, the light distribution device, the illumination system and the imaging system may be applied for various other applications as well. By way of example, they could be used in applications wherein elastically scattered light from the sample is of interest. Moreover, the light distribution device and/or the illumination system may find application also in other fields not related to imaging. Such applications may involve guiding or distributing light in specific manners to manipulate other entities by means of the light. By way of example, the light distribution device and/or the illumination system may find application within the fields of optical trapping and quantum computing.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A light distribution device comprising:
   at least one waveguide configured for propagation of light along an extension of the waveguide, said at least one waveguide comprising an elongated light coupling portion;
   a slab layer extending in a plane, the slab layer comprising at least one light coupling edge arranged at a boundary of the slab layer in the plane, said slab layer being configured for propagation of light in the plane;
   wherein the light coupling portion of the at least one waveguide extends alongside and at a distance from the at least one light coupling edge, forming a gap between the light coupling portion and the at least one light coupling edge;
   wherein the light distribution device is further configured to allow at least some of the light being propagated in the at least one waveguide to be coupled into the slab layer through the at least one light coupling edge across the gap,
   wherein the slab layer is configured to propagate the light coupled into the slab layer from the at least one waveguide such that an interference pattern is formed by interference of light in the slab layer; and
   wherein the light distribution device is configured for control of the interference pattern by tuning at least one of a phase, a wavelength, an amplitude, or a polarization of light propagated in the at least one waveguide and/or by tuning a medium property of the slab layer and/or the at least one waveguide and/or, in case the light distribution device comprises a plurality of waveguides including the at least one waveguide, by control of active waveguides among the plurality of waveguides.

2. The light distribution device according to claim 1, wherein a light propagation direction of the light coupling portion coincides with a direction in which the light coupling portion is elongated, such that the light propagating direction extends alongside the at least one light coupling edge.

3. The light distribution device according to claim 1, wherein the slab layer is configured to propagate the light coupled into the slab layer from the at least one waveguide such that a width of a cross-section of the light in the slab layer, is larger than a width of a cross-section of the light in the waveguide.

4. The light distribution device according to claim 1, wherein the light coupling portion of the at least one waveguide extends in parallel with the at least one light coupling edge of the slab layer.

5. The light distribution device according to claim 1, wherein a distance between the light coupling portion and the at least one light coupling edge in the gap is different at different positions along the light coupling portion, such that a gap profile between the light coupling portion and the at least one light coupling edge is non-uniform.

6. The light distribution device according to claim 5, wherein the gap profile has a sinusoidal shape.

7. The light distribution device according to claim 1, further comprising a cladding layer in the gap between the light coupling portion of the at least one waveguide and the at least one light coupling edge of the slab layer, the cladding layer being configured to control the coupling of light between the at least one waveguide and the slab layer.

8. The light distribution device according to claim 1, wherein the at least one waveguide and the slab layer are arranged on a common substrate.

9. The light distribution device according to claim 1, wherein the at least one waveguide comprises a first waveguide and a second waveguide;
   wherein the at least one light coupling edge comprises a first light coupling edge and a second light coupling edge; and
   wherein a light coupling portion of the first waveguide extends alongside the first light coupling edge, and a light coupling portion of the second waveguide extends alongside the second light coupling edge; and
   wherein the light distribution device is further configured to form the interference pattern by interference of light being coupled into the slab layer from at least the first waveguide to the first light coupling edge, and the second waveguide to the second light coupling edge.

10. The light distribution device according to claim 1, further comprising a reflective element; and
    wherein the light distribution device is configured to direct light coupled from the at least one waveguide into the slab layer, in the plane from the at least one light coupling edge to the reflective element; and
    wherein the reflective element is configured to reflect at least part of the light back into the slab layer as reflected light, whereby the light and the reflected light form an interference pattern by interference in the slab layer.

11. Illumination system for illumination of a sample, the illumination system comprising:
    a light distribution device according to claim 1; at least one light source being configured to generate light, and to provide light to the at least one waveguide;
    wherein the illumination system is further configured such that the interference pattern has an evanescent light field outside the slab layer, wherein the evanescent light field of the interference pattern is configured to illuminate a sample in close relation to the slab layer;
    the illumination system further comprising a controller configured to control forming of the interference pattern in the slab layer by interference of the light being propagated therein, wherein the interference pattern comprises at least one element of constructive interference for selectively illuminating a portion of the sample;
    wherein the controller is configured to sequentially change the interference pattern in relation to the sample such that different portions of the sample are illuminated.

12. The illumination system according to claim 11, further comprising at least one influencing device connected to the controller, the influencing device being configured for tuning, in response to a signal from the controller, at least one of a phase, a wavelength, an amplitude, or a polarization of the light from the at least one light source being provided to the at least one waveguide, and/or for tuning a medium property of the slab layer and/or the at least one waveguide thereby controlling the interference pattern in the slab layer.

13. The illumination system according to claim 11, in case the light distribution device comprises a plurality of waveguides including the at least one waveguide, the controller is configured for control of active waveguides among the plurality of waveguides, thereby controlling the interference pattern in the slab layer.

14. Imaging system comprising:
    an illumination system according to claim 11;
    a detector comprising an array of light sensitive areas, the detector being configured to detect light from the sample, wherein the detector is arranged on a common substrate with the slab layer;
wherein the detector is configured to sequentially detect light from different portions of the sample, following the sequentially changing of the interference pattern by the controller.

* * * * *